United States Patent [19]

Fukuoka et al.

[11] Patent Number: 5,001,678
[45] Date of Patent: Mar. 19, 1991

[54] SYSTEM FOR DETECTING SURROUNDING ENVIRONMENTAL CONDITIONS USING A MULTIPLE NUMBER OF INCOMING SIGNALS

[75] Inventors: Itsuo Fukuoka; Hiroshi Nagano, both of Kobe, Japan

[73] Assignee: Furuno Electric Company, Ltd., Hyogo, Japan

[21] Appl. No.: 366,513

[22] Filed: Jun. 15, 1989

[30] Foreign Application Priority Data

Jun. 20, 1988 [JP] Japan .................................. 63-152916

[51] Int. Cl.5 ............................................ G01S 15/00
[52] U.S. Cl. .................................... 367/105; 367/903; 73/626
[58] Field of Search ............... 367/100, 103, 105, 903, 367/135, 7; 73/625, 626; 128/661.01; 364/413.25

[56] References Cited

U.S. PATENT DOCUMENTS

4,127,034  11/1978  Lederman et al. ..................... 367/7
4,403,314   9/1983  Tournois ............................. 367/100
4,817,066   3/1989  Takasugi et al. ..................... 367/903

Primary Examiner—Thomas H. Tarcza
Assistant Examiner—Dan Pihulic

[57] ABSTRACT

A detection system forms a plurality of reception beams successively in angular directions by receiving incoming signals from various directions in a manner that the Doppler effect is produced to vary the carrier frequency of the incoming signals. The detection system displays underwater conditions on an indicator. To determine the underwater conditions, the detection system uses a plurality of ultrasonic transducers for receiving incoming signals, a plurality of preamplifiers for amplifying the reception signals produced by the ultrasonic transducers. A first coupling device which connects at least two of the ultrasonic transducers to a single preamplifier, and a matched filter for pulse-compressing reception signals produced by the ultrasonic transducers. A second coupling device successively couples the output terminals of the preamplifiers to an input terminal of the matched filter. The indicator displays output signals from the matched filter. The use of the first coupling device reduces the number of the preamplifiers.

12 Claims, 10 Drawing Sheets

SYSTEM FOR DETECTING SURROUNDING ENVIRONMENTAL CONDITIONS USING A MULTIPLE NUMBER OF INCOMING SIGNALS

BACKGROUND OF THE INVENTION

The present invention relates to a detection system for receiving incoming signals coming from many different directions and presenting indications of the direction and/or range of a source of incoming signals. More particularly, it relates to a detection system which comprises (i) means for receiving incoming signals in a manner that the Doppler effect is produced to vary the carrier frequency of the incoming signals (ii) a matched filter coupled to the receiving means to pulse-compress output signals therefrom, and (iii) an indicator for displaying output signals from the matched filter, and which forms a plurality of reception beams successively in angular directions. This type of detection system is enclosed in U.S. Pat. No. 4,425,634.

Hereinafter, the invention will be described as embodied in a scanning sonar for receiving incoming signals from many different directions in a wide range of angles to indicate the direction and range of objects on the face of an indicator.

Figure 12:
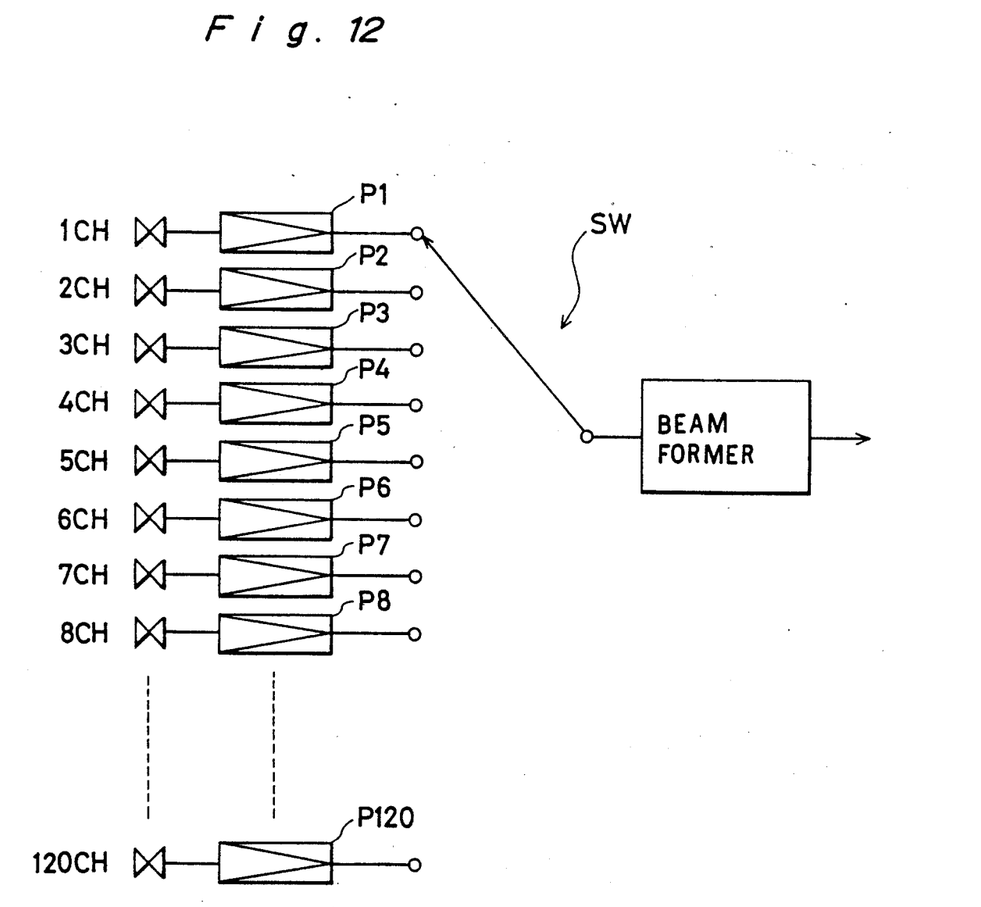
FIG. 12 shows a schematic block diagram of a relevant part of a prior art detection system.

Referring to FIG. 12 in which a relevant portion of a prior art detection system is shown, one hundred and twenty ultrasonic transducers 1CH through 120CH are disposed on an imaginary circle as equidistantly spaced, which forms one row of transducers Preamplifiers P1 through P120 amplify reception signals caught by the ultrasonic transducers 1CH through 120CH respectively. A selector SW successively connects, at a predetermined speed, the output terminal of each of the preamplifiers P1 through P120 to the input terminal of a beamformer BM to supply the beamformer with the output signals of each of the preamplifiers P1 through P120. As a result the Doppler effect is produced to vary the carrier frequency of the incoming signals received The beamformer comprising a matched filter pulse-compresses the received signals to produce signals having come in a desired direction and detected The reception signals produced by each of the transducers 1CH through 120CH are selected and derived at the output terminals of the preamplifiers P1 through P120 to be supplied to the input terminal of the beamformer.

With the prior art detection system, six rows of ultrasonic transducers are disposed in parallel with each other on the surface of a cylinder along the circumference thereof, with each row comprising one hundred and twenty ultrasonic transducers. Thus, seven hundred and twenty ultrasonic transducers are disposed on the surface of a cylinder, and the same number of preamplifiers are required to be incorporated in the receiving unit of the detection system, since all the ultrasonic transducers are separately and respectively connected to the corresponding preamplifiers. The switch SW is incorporated between the output terminals of the preamplifiers P1 through P120 and the input terminal of the beamformer, and the reception signals produced by each of the transducers 1CH through 120CH are selected by the switch SW to be applied at the input terminal of the beamformer BM. Accordingly, the dimensions of the receiving unit and the electric power consumed by the receiving unit are determined by the number of the preamplifiers. Manufacturing cost of the receiving unit is substantially determined by the cost of the preamplifiers.

SUMMARY OF THE INVENTION

Accordingly, an object of the present invention is to provide a detection system which is greatly reduced in size without degrading the performance of the system, so that it is easy to handle and to be maintained.

Another object of the invention is to provide a detection system which is capable of successively deriving output signals of each of the ultrasonic transducers with lesser number of the preamplifiers, thereby reducing the dimensions of the receiving unit, manufacturing cost thereof and the electric power consumption thereof.

Figure 1:
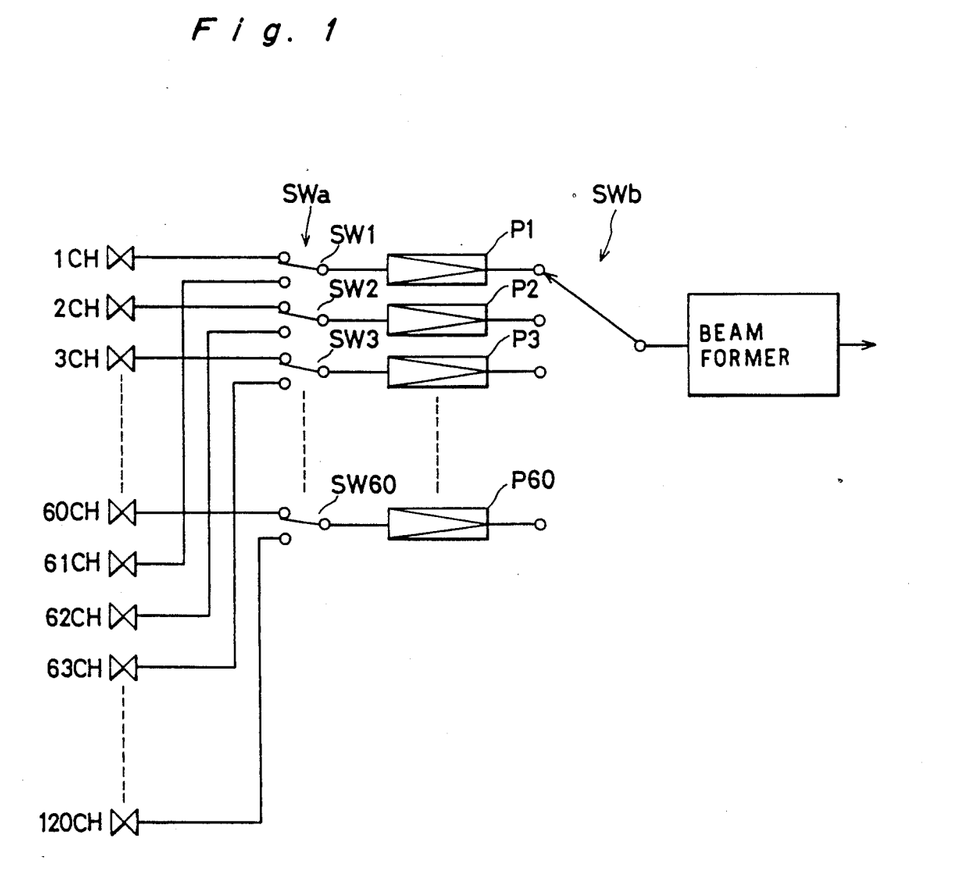
FIG. 1 shows a schematic block diagram of a relevant principal portion of an embodiment according to the present invention.
Figure 2:
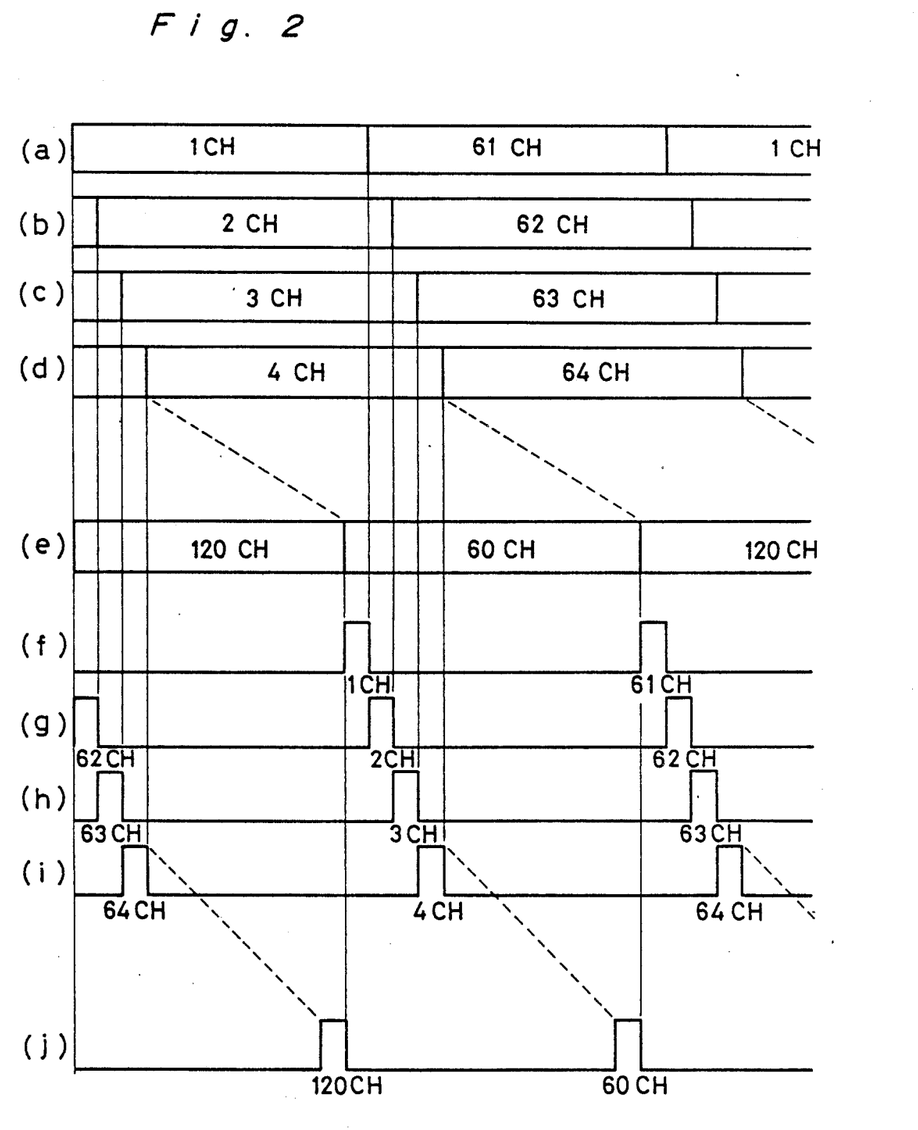
FIG. 2 shows a time sequence diagram illustrating how the switches in FIG. 1 are operated, and how the ultrasonic transducers and the input terminal of the beamformer are coupled.

Another object of the invention is to provide a detection system which derives the reception signals produced by the ultrasonic transducers by means of a switch incorporated between the transducers and the input terminals of the preamplifiers and another switch incorporated between the output terminals of the preamplifiers and the input terminal of a beamformer According to one aspect of the present invention, a detection system for receiving incoming signals from a plurality of directions in a manner that the Doppler effect is produced to vary the carrier frequency of the incoming signals, and presenting a display resulting from the received incoming signals on an indicator is provided which comprises (i) a plurality of ultrasonic transducers for receiving incoming signals (ii) a plurality of preamplifiers for amplifying the reception signals produced by the ultrasonic transducers, (iii) first coupling means for connecting each of the ultrasonic transducers to corresponding one of the preamplifiers, (iv) a matched filter for pulse-compressing reception signals produced by the ultrasonic transducers, (v) second coupling means for successively coupling the output terminals of the preamplifiers to the input terminal of the matched filter, and (vi) an indicator for displaying output signals from said matched filter Referring to FIG. 1 and FIG. 2 the principle of the present invention will be explained hereinafter. One hundred and twenty reception transducers 1CH through 120CH are disposed on a circle as equidistantly spaced. These transducers are divided into two groups, with one group including the transducers 1CH through 60CH, and with the other group having the transducers 61CH through 120CH. The input terminal of each of preamplifiers p1 through P60 is alternately connected by means of a switch SWa to corresponding one transducer of the two transducer groups, i.e., the transducers 1CH through 60CH and the transducers 61CH through 120CH. The switch SWa comprises sixty switch elements SW1 through SW60. A switch SWb successively connects the output terminals of the preamplifiers p1 through P60 to the input terminal of a beamformer BM The switch SWb is comprised of digitally controlled analog switches, for example, of analog multiplexers the MC14051Bs manufactured by Motorola Inc. Thus, the reception signals amplified by the preamplifiers p1 through P60 are successively derived and supplied to the beamformer BM.

Referring to FIG. 2, the portions designated as (a) through (e) illustrate how the switch SWa comprising sixty switch elements SW1 through SW60 is operated. Symbols 1CH through 120CH in brackets are the ones assigned to the ultrasonic transducers. Thus, it is illustrated how the ultrasonic transducers are connected to the input terminals of corresponding preampifiers. The portions designated as (f) through (j) illustrate how the switch SWb is operated, i.e., how the output terminal of a preamplifier corresponding to transducer is connected to the input terminal of the beamformer. Symbols 1CH through 120CH are also assigned to the transducers it will be apparent from the time sequence diagrams that the ultrasonic transducers 1CH through 120CH are successively coupled to the input terminal of the beamformer BM by means of the switches SWa and SWb which are controlled by a controller

BRIEF DESCRIPTION OF THE DRAWINGS

In the drawings.

Throughout the drawings, the same reference numerals and symbols are given to like components

DESCRIPTION OF THE PREFERRED EMBODIMENTS

Figure 6:
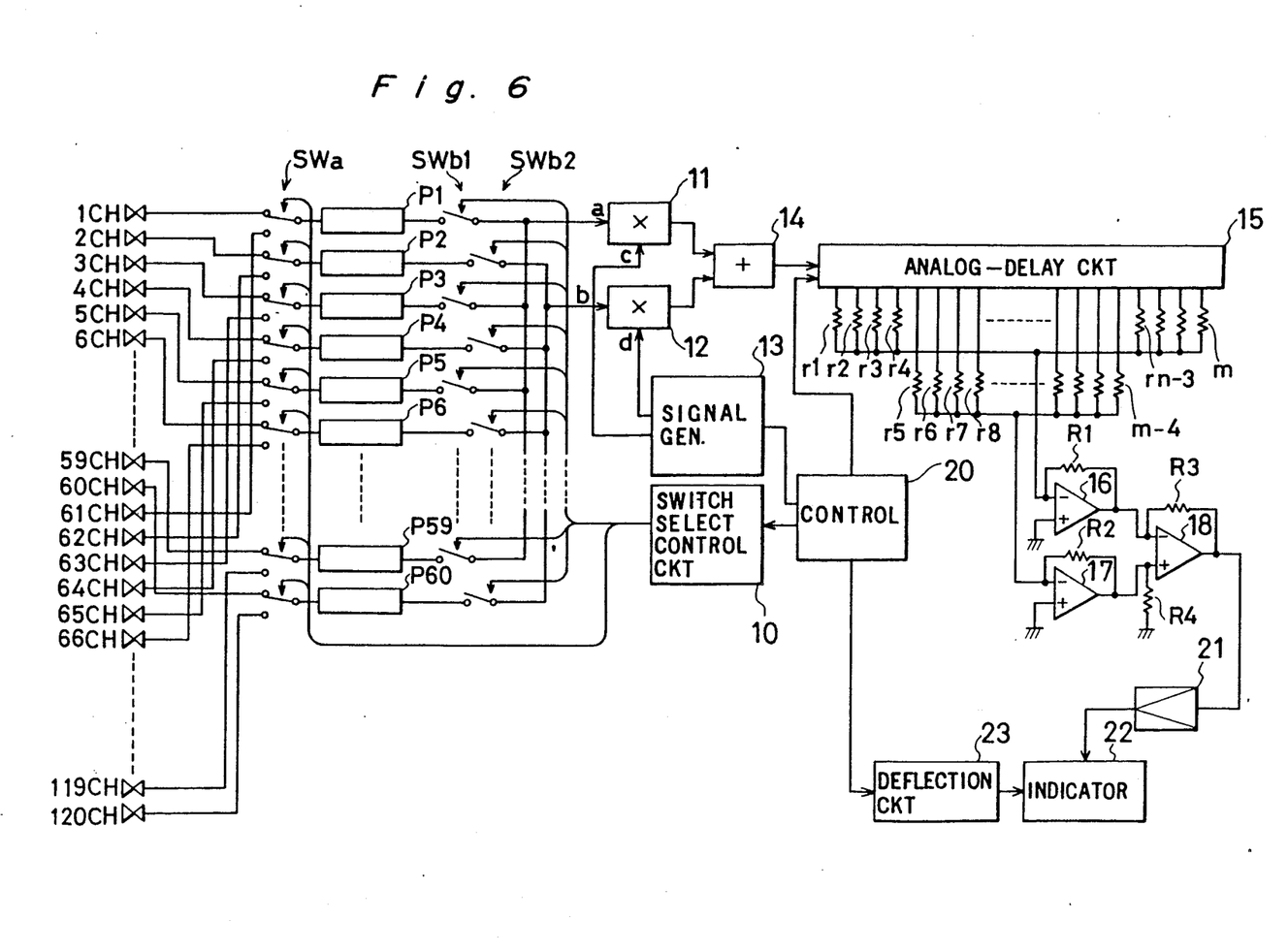
FIG. 6 shows a bock diagram of an embodiment according to the invention.

Referring to FIG. 6, one hundred and twenty ultrasonic electrostrictive transducers 1CH through 120 CH are disposed on a circle equidistantly spaced apart. These transducers are divided into two qroups, with the one group including the transducers 1CH through 60CH and the other group consisting of the transducers 61CH through 12OCH. The input terminal of each of the preamplifiers P1 through P60 is: connected by means of a switch SWa to a corresponding one of the transducers of each of the two groups 1CH through 60CH and 61CH through 120CH. The switch SWa comprises sixty switching elements SW1 through SW60. The switching element SW1 alternately connects the input terminal of the preamplifier P1 to one o the transducers 1CH and 61CH. The switching element SW2 connects the input terminal of the preamplifier p2 to one of the transducers 2CH and 62CH. In the same way, each of the switching elements SW3 through SW60 alternately connects the input terminal of one of the preamplifiers P3 through P60 to one transducer of each corresponding pair of the transducers 1CH and 63CH through 60CH and 120CH. A switch SWb1 comprises thirty switching elements which successively connect the output terminals of the odd-numbered preamplifiers P1, P3, ..., P59 to the input terminal of a multiplier 11. A switch SWb2 comprises thirty switching elements which successively connect the output terminals of the even-numbered preamplifiers p2, P4, ..., P60 to the input terminal of a multiplier 12. A switch select control circuit 10 controls the switches SWa SWb and SWb2 to select switching elements to perform connecting and disconnecting operations as desired The switch SWa firstly and successively connects the input terminal o& each of the preamplifiers P1 through p60 to a corresponding one of the ultrasonic transducers 1CH through 60CH and then successively connects the input terminal of each of the preamplifiers P1 through p60 in the order of p1, P2 .., P60 to corresponding one of the transducers 61CH through 120CH. The switches SWb1 and SWb2 successively and respectively connect the output terminals of the odd-preamplifiers numbered and even-numbered preamplifiers P1 through P60 to the input terminals of the multipliers 11 and 12 so that the output terminals of the preamplifiers P1 through p60 are successively coupled to the input terminal o the beamformer. A signal generator 13 produces triangular waveform signals which are shifted in phase from each other, and supplies the multipliers 11 and 12 with these shaped signals designated as "c" and "d" (shown in FIG. 7) at the other inputs thereof respectively. The multiplier 11 multiples the reception signals designated as "a" (shown in FIG. 7) supplied from the preamplifiers at the one input thereof with triangular wave signals designated as "c" (shown in FIG. 7) supplied at the other input terminal thereof and supplies an adder 14 with the resultant signals at one input terminal thereof The mutiplier 12 multiplies the reception signals designated as "b" (shown in FIG. 7) supplied from the preamplifiers at the one input terminal thereof with triangular wave signals designated as "d" (shown in FIG. 7) supplied at the other input thereof and supplies the adder 14 with the resultant signals at the other input thereof The adder 14 adds the signals supplied to the two input terminals to one another and supplies the resultant added signals to a signal input terminal of an analog-delay circuit 15.

Figure 7:
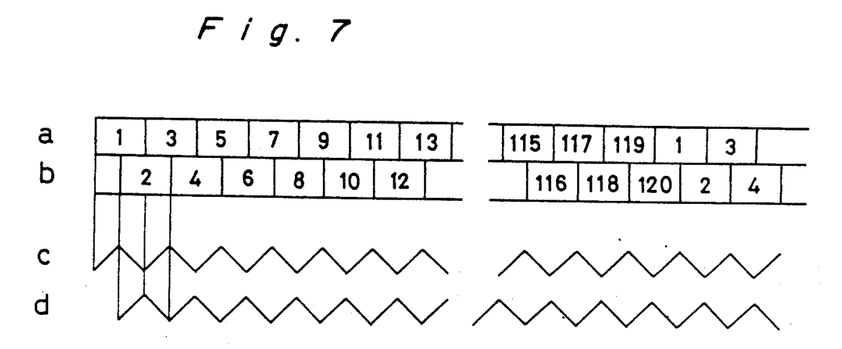
FIG. 7 shows amplitude variations of input signals applied at the two input terminals of the multipliers 11 and 12 shown in FIG. 6, FIGS. 8, 9 and 10 show response characteristics of a filter included in each of the preamplifiers shown in FIGS. 1, 3 and 6.

The relationship between the signals designated as "a", "b", "c" and "d" is as shown in FIG. 7. In FIG. 7a and FIG. 7b, the numerals given to each block correspond to the numbers assigned to the ultrasonic transducers 1CH through 120CH. As will be apparent, the reception signals produced by two adjacent transducers are increasingly or decreasingly weighted with time to average the reception signals, thereby obtaining the same signals as received by one ultrasonic transducer mechanically rotated at a constant speed.

The analog-delay circuit 15 has a plurality of i.e., n, output terminals equidistantly spaced apart, and stores the reception signals produced by ultrasonic transducers of a group used for forming a reception beam. Resistors r1, r2, r3, and are inserted between the corresponding output terminals of the analog-delay circuit 15 and one input terminal of operational amplifiers 16 and 17. To the one input of the operational amplifier 16, signals obtained by sampling the positive portions of the input signals applied at the input of the analog-delay circuit 15 are supplied To the one input of the operational amplifier 17, signals obtained by sampling the negative portions of the signals inputted to the delay circuit 15 are supplied. The output terminal of the operational amplifiers 16 and 17 are connected to the two input terminals of an operational amplifier 18 respectively. The input signals applied at the signal input of the delay circuit 15 are advanced therein each time a clock pulse is applied at the clock input of the circuit 15, and the signals stored therein appear at the corresponding output terminals. These output signals of the analog-delay circuit 15 are weighted by the resistors r1, r2, r3, , rn and resistors R1 and R2 inserted between the one input terminal of the operational amplifiers 16 and 17 and the output terminals thereof respectively to produce resultant signals which are added to one another by the operational amplifier 18. The values of the resistors r1, r2, r3, . . . , and resistors R1 and R2 are respectively determined in such a way that the amplitude of the signals from a sound source in a desired direction becomes maximum with respect to that of other incoming signals from the other directions when a first signal supplied at the signal input of the analog-delay circuit reaches the right end thereof and al the output signals appear at the respective output terminals thereof Thus, a matched filter is formed by the analog-delay circuit 15, resistors r1, r2, r3, . . . , rn, operational amplifiers 16, 17 and 18, and resistors R1, R2, R3 and R4.

An amplifier 21 amplifies the output signals &rom the operational amplifier 18 containing only the incoming signals having come from a desired direction and supplies the resultant amplified signals to the input terminal of an indicator 22 comprising, for example, a cathode-ray tube. A deflect ion circuit 23 produces deflection signals for deflecting the electron beams of the cathode-ray tube concentrically. A controller 20 produces timing control signals and supplies the switch select control circuit 10, signal generator 13, analog-delay circuit 15 and deflection circuit 23 with the respective control signals Referring to FIG. 3, one output terminal o the ultrasonic transducer 1CH is connected to the source terminal of a depletion-mode p-channel junction field-effect transistor (hereinafter called as "FET") Q1 such as 2SJ103 manufactured by Toshiba. The drain terminal of the FET Q1 is connected to the input terminal of the preamplifier P1. One output terminal of the ultrasonic transducer 61CH is connected to the source terminal of a FET Q61. The drain terminal of the FET Q61 is also connected to the input terminal of the preamplifier P1. The qate terminals of the FETs Q1 and Q61 are respectively supplied with control signals having a TTL amplitude level from the switch select control circuit 10 to switch the FETs on and to pass therethrough reception signals caught by the transducers 1CH and 61CH. Two pairs of diodes shown in FIG. 3 for limiting circuits to limit the amplitude levels of the input signals supplied to the FETs Q1 and Q61.

Figure 3:
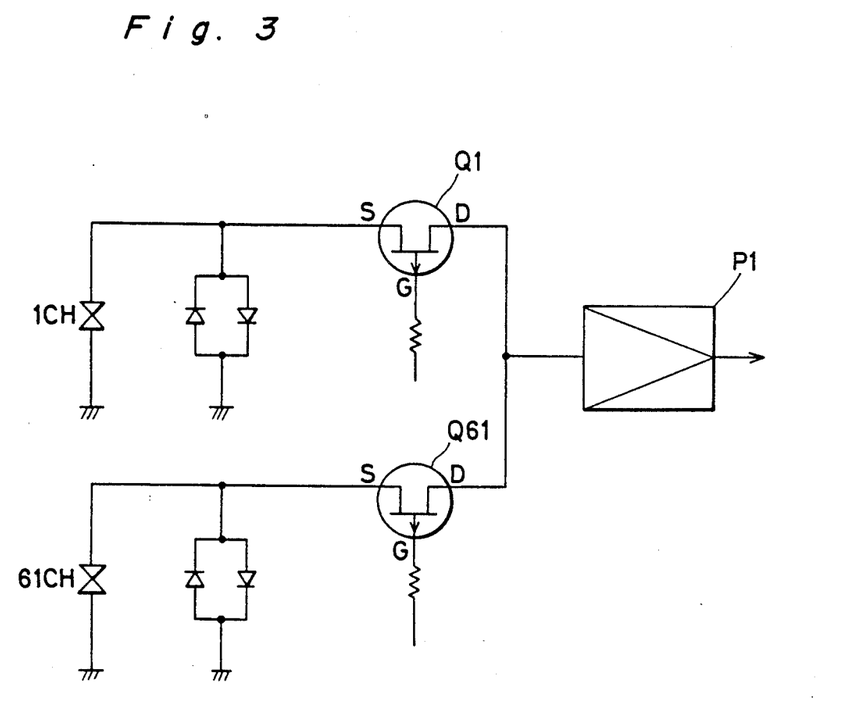
FIG. 3 shows a circuit configuration of a portion of a switch SWa of an embodiment according to the invention shown in FIG. 6.
Figure 4:
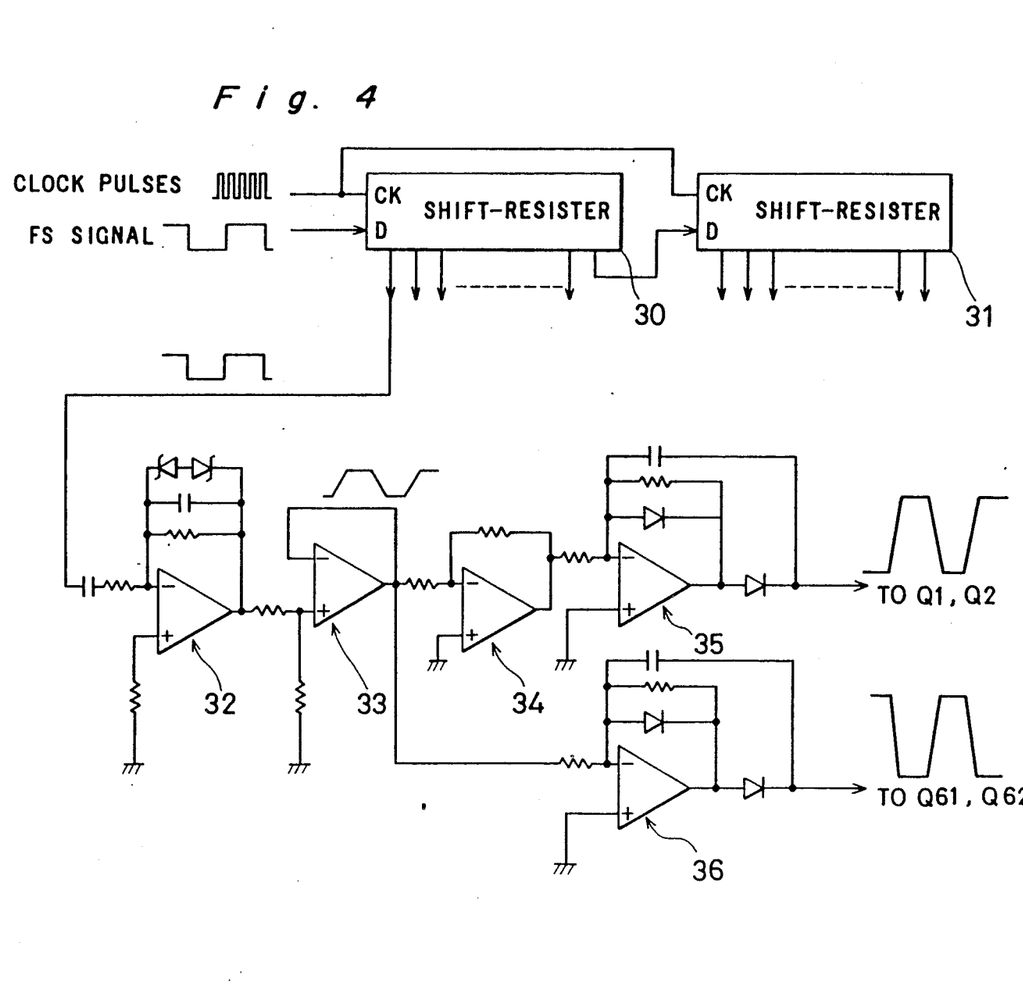
FIG. 4 shows a circuit configuration of a signal generator producing control signals for controlling field effect transistors as shown in FIG. 3.

FIG. 4 shows a circuit diagram for producing the control signals supplied to the gate terminals of the FETs such as Q1 and Q61 shown in FIG. 3. Referring to FIG. 4 shift-registers 30 and 31 are connected in series with each other to have thirty output terminals To one input terminal of the shift-register 30, there are supplied FS signals determining on-off periods of the FETs such as the FETs Q1 and Q61 shown in FIG. 3, while clock pulses are supplied to the clock input terminal thereof At respective output terminals to the shift-registers 30 and 31, there are produced FS signals which are successively shifted by a time equivalent to the recurrence period of the clock pulses. A waveform conversion circuit 32 is comprised of an operational amplifier, a condenser, a resistor and zener diodes and functions to convert an FS signal shaped in a rectangular form into a substantial trapezoid waveform A signal level lowering circuit 33 is comprised of an operational amplifier and resistors A signal level conversion circuit 36 functions to raise the voltage level of the output signals of the signal level lowering circuit 33 to the pinch-off voltage level of the FET. A polarity inversion circuit 34 is comprised of an operational amplifier and resistors and functions to inverse the polarity of the output signals of the signal level lowering circuit 33. A signal level conversion circuit 35 is constructed in the same way as the signal level conversion circuit 36. The output signal of the signal level conversion circuit 35 is supplied to the gate terminals of the FETs Q1 and Q2. The output signal of the signal level conversion circuit 36 is supplied to the gate terminals of the FETs Q61 and Q62. In the same way, the output terminals of the other signal level conversion circuits are respectively coupled to the gate terminals of a corresponding pair of the FETs. Thus, the switching elements i.e., the FETs, are driven by rectangular waveform signals, the leading and trailing edges of which are rounded off at the upper and lower points thereof. The use of such modified signals suppresses high frequency components included in the control signals, thereby drastically reducing noises produced when switching operations are performed by the FETs.

Figure 5:
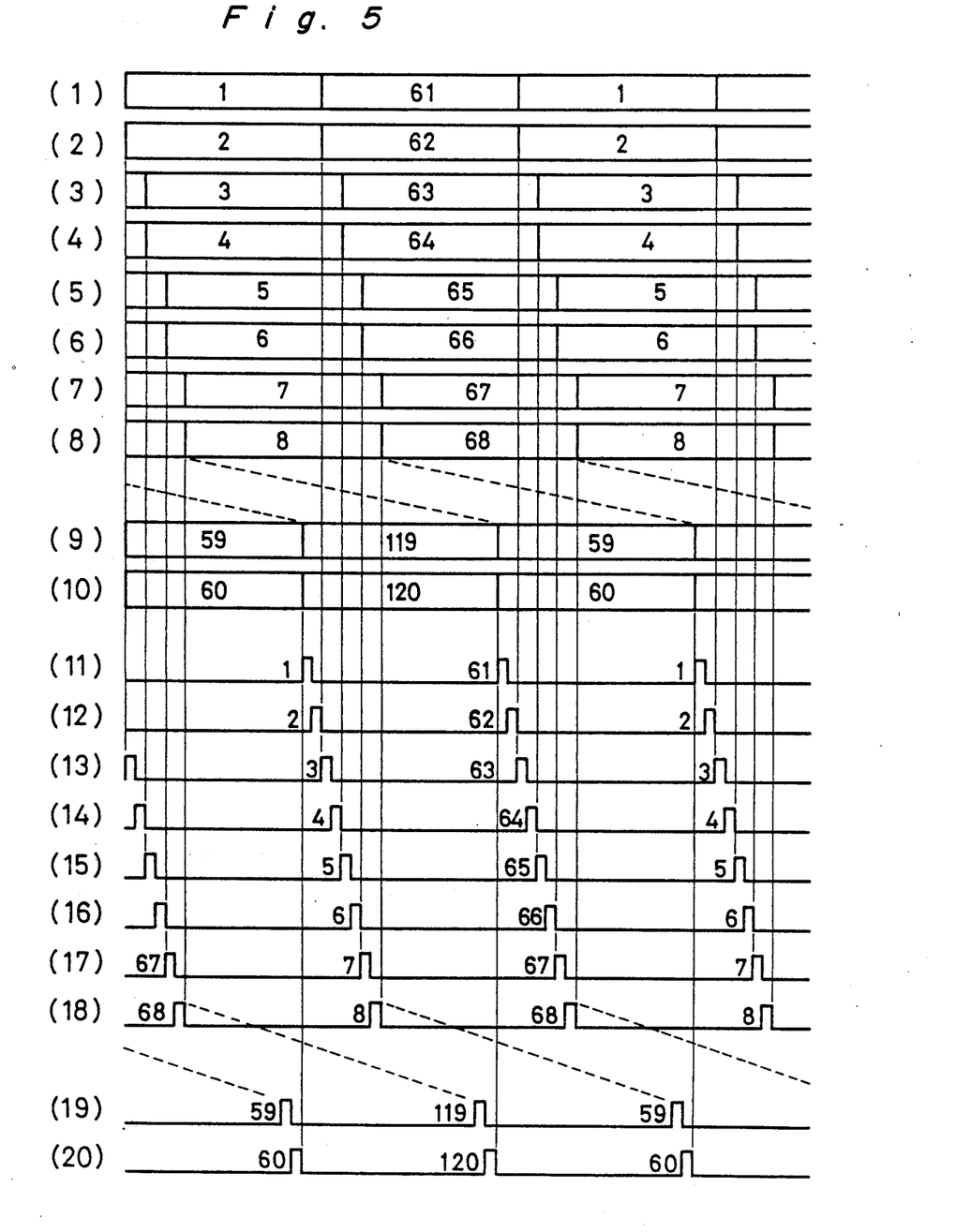
FIG. 5 shows a time sequence diagram illustrating how switches SWa, SWb1 and SWb2 shown in FIG. 6 are operated, i.e., how the input terminal of the beamformer is coupled to transducers.
Figure 8:
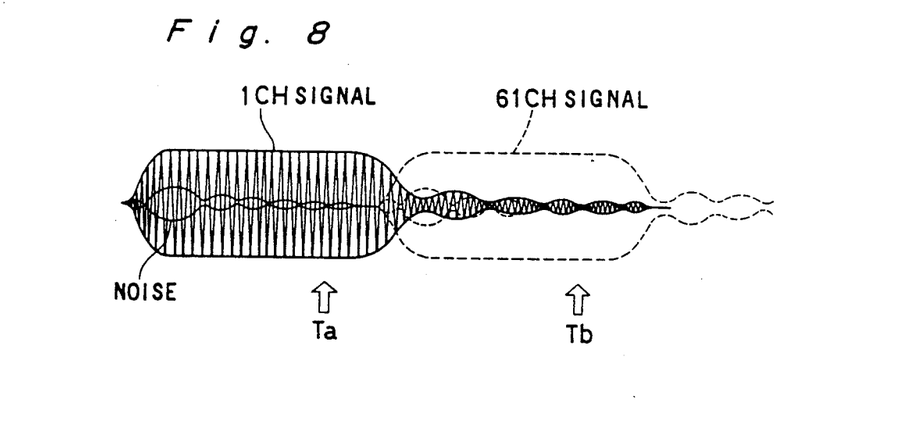

Referring to FIG. 5, the portions designated as (1) through (10) illustrate how the switch SWa is operated. Numerals in brackets correspond to the numbers assigned to the ultrasonic transducers 1CH through 120CH The portions designated as (11) through (20) illustrate how the switches SWb1 and SWb2 are switched on and off. Numerals in this part of the figure respectively correspond to the transducers supplying their output signals to the corresponding preamplifiers in this embodiment of the present invention, as shown in FIG. 5 (1) through (10), pairs of two adjacent transducers such as 1CH and 2CH, 3CH and 4CH are connected to or disconnected from corresponding preamplifiers p1 through P4 at the same time. This arrangement reduces the number of the drive circuits shown in FIG. 4 for the switching elements by one-half Some aspects of the filter included in the preamplifier will be explained below. In the foregoing embodiment of the present invention, for example, to the input of the preamplifier p1, the reception signals caught by the transducers 1CH and 61CH are alternately supplied When the FETs Q1 and Q61 are respectively switched on and off for connecting the transducers 1CH and 61CH to the input terminal of the preamplifier P1 and disconnecting the transducers therefrom, noises are produced and are also applied at the input terminal of the preamplifier. The noises are prominent in terms of amplitude with respect to the reception signals applied at the input terminal of the preamplifier, since the reception signals transmitted from the transducers thereto are weak and small. Further, the reception signals in rectangular shapes applied at the input terminal of the preamplifiers are rounded off thereby at the leading and trailing edges of the signals since the frequency characteristics of the preamplifiers are of narrow bandwidth. The phenomena is illustrated in FIG. 8. Referring to FIG. 8, "Ta" shows an instant at which the reception signals produced by the transducer 1CH are sampled, while "Tb" shows an instant at which the reception signals produced by the transducer 61CH are sampled. If a noise tail resulting from the switching operation in relation to the transducer 61CH is still existing at the instant "Ta", the noise tail becomes a noise having directional information, thereby decreasing the S/N ratio. While, if a noise tail resulting from the switching operation in relation to the transducer 1CH is still existing at the instant "Tb", the noise will be crosstalk in the signals produced by the transducer 61CH. Accordingly, effects caused by the noise tail have to be reduced in designing the filter included in the preamplifier.

Figure 11:
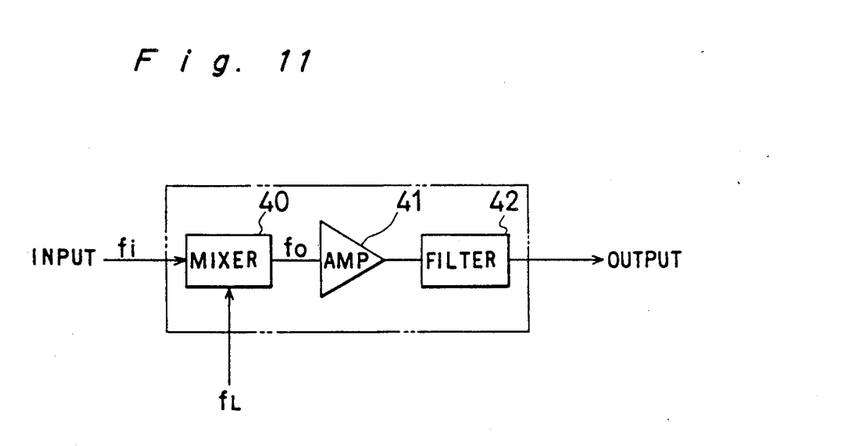
FIG. 11 shows a block diagram of each of the preamplifiers used in an embodiment of the invention.

Referring to FIG. 11, a mixer 40 is supplied with the reception signals with their frequency "fi" rom the corresponding transducers at one input terminal thereof and with signals having their frequency "f" from a local oscillator at the other input terminal thereof. The mixer YO performs frequency conversion to produce output signals with their frequency "fo=fi−f" to the input terminal of an amplifier 41 for amplifying the input signals A bandpass filter 42 passes the signals having frequencies within a predetermined frequency range. The effects explained above are reduced by appropriately designing the frequency characteristics of the filter 42.

Figure 9:
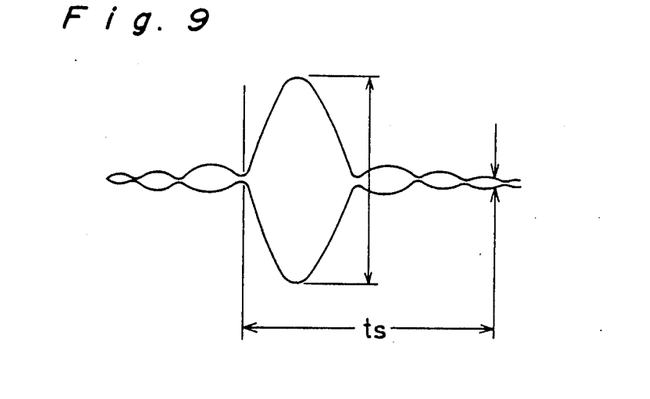

With regard to noises produced by a corresponding FET when switched on and off, impulse response is first analyzed which is possessed by the filter. FIG. 9 shows a waveform illustrating an impulse response for the filter. The time "ts" represents a period from a time instant at which a switching noise is produced to another time instant at which signals are sampled. The filter is designed to have an impulse response, the value of which becomes smaller than a predetermined value with respect to the amplitude of the reception signals at the time instant when the signals are sampled.

Figure 10:
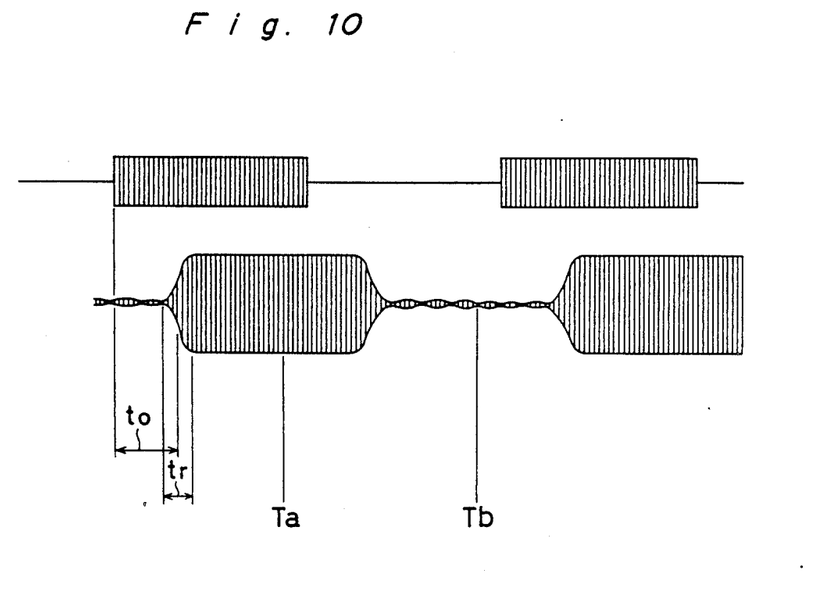

With regard to a signal tail resulting from the reception signals, the filter response to a burst signal is analyzed. FIG. 10 shows burst signals and resultant response waveforms. Here, "to" represents delay time, and is given by phase spectrum incination in the frequency range of the filter. "tr" is rise time and is inversely proportional to the frequency bandwidth of the filter. Further, the amplitude of ripples included in a tail portion is obtained by analyzing the variation of a sinusoidal intequal function. In this way, the filter characteristics are determined in such a way that the impulse response of the filter for burst signals is anayzed, and the difference between the amplitude of the reception signals produced by he transducer 1CH and that of the reception signals produced by the transducer 61CH i.e., the crosstalk ratio, becomes qreater than a predetermined level.

Reduction of the switching noises and improvement of decoupling the crosstalk are attained by widening the frequency bandwidth of the preamplifiers. But, improper widening of the bandwidth results in decreasing the S/N ratio. Thus, the frequency bandwidth of filter is required to be made as narrow as possible. A desired frequency bandwidth o the preamplifiers is determined based on the frequency bandwidth in relation to the Doppler-shift with the carrier frequency and the frequency bandwidth in relation to the pulse-width of the search pulse signal radiated into the water. With regard to the Doppler-shift, the following approximate equation to obtain the frequency bandwidth is used:

$$\pm \Delta f1 = 0.7 \, m \, f \, [Hz]$$

Herein
m : Ship's relative speed with respect to objects detected [Knot]
f : center frequency [KHz]

With regard to the pulse-width of the search pulse signal, the following approximate equation to obtain the frequency bandwidth is used:

$$\pm \Delta f2 = 1.3/2\Delta T$$

Herein
$\Delta T$ : pulse-width of the search pulse signal

Figure 13:
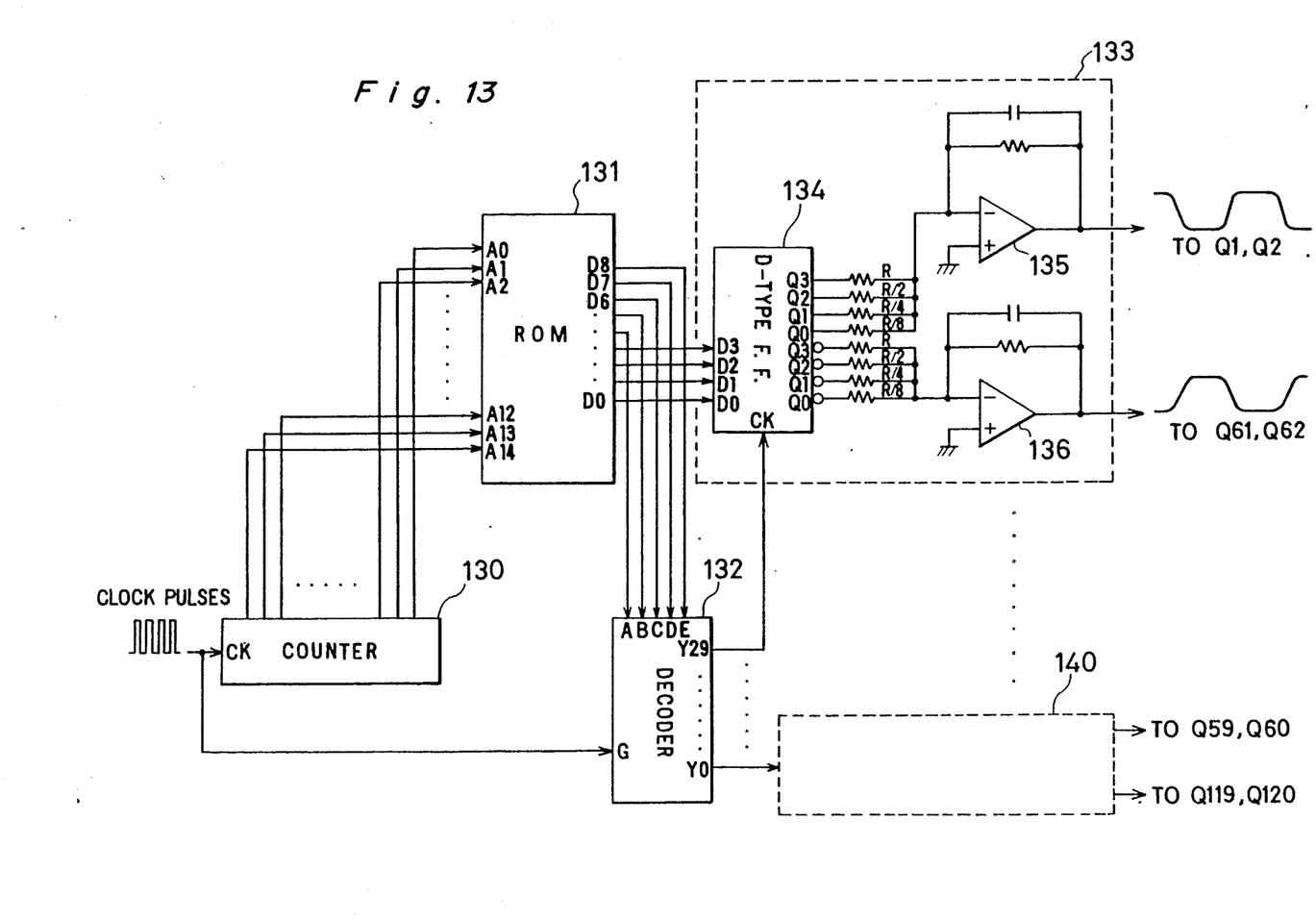
FIG. 13 shows another circuit configuration of the signal generator producing control signals for controlling field-effect transistors as shown in FIG. 3.

It should be noted that although the signal generator producing control signals for controlling the FETs is used in the foregoing embodiment, another signal generator shown in FIG. 13 is also used. Referring to FIG. 13, the signal generator comprises a counter 130 a memory 131, a selector 132, thirty digital-to-analog converters (hereinafter referred to as "D-A converters") 133 and 140 The D A converter 133 comprises a match circuit 134 comprising D-type flip-fops, resistors, two operational amplifiers 135 and 136, two resistors and two condensors. The operational amplifier 135 produces control signals supplied to the gate terminals o the FETs Q1 and Q2, while the operational amplifier 136 produces control signals supplied to the gate terminals of the FETs Q61 and Q62. The control signals are formed with the upper and lower flat level portions and curved portions between the upper and lower levels, with the curved portions being shaped in sine waveforms Four output signals appearing at four output terminals of a group of the latch circuit 134 are respectively weighted with the four respective resistors, the values of which are respectively represented as R, R/2, R/4 and R/8. The resultant weighted signals are supplied to one input terminal of the operational amplifier 135. Four output signals appearing at four output terminals of the other group of the latch circuit 134 are respectively weighted with the four resistors. The resultant weighted signals are supplied to one input terminal of the operational amplifier 136. Cock pulses are supplied to one input terminal of the counter 130 and the selector 132. The counter 130 successively produces varying count values supplied to the fifteen input terminals: of the memory 131 which comprises a read-only-memory. The memory 131 stores thirty kinds of digital signals each representative of two portions of a sine waveform corresponding to the curved portions of the signals produced by the D-A converter. The memory 131 supplies digital signals of a group representative of portions of sire waveforms to the four input terminals o the latch circuit 134 and also supplies digital signals of the other group to the selector 132 comprising a decoder. The selector 132 successively selects the thirty D-A converters and supplies the match circuits of the D-A converters with pulses at the clock input terminals thereof. The latch circuit 134 produces output signals in response to the pulses applied at the clock input terminals thereof.

It should be noted that although the signal generator 13 produces triangular waves for the multipliers 11 and 12 in the foregoing embodiment, it can also produce and transmit sine or cosine waves thereto to obtain the same result as in the above embodiment.

It should be noted that although any a row of one hundred and twenty ultrasonic transducers disposed on an imaginary circle is used in the foregoing embodiment according to the present invention, a plurality of the rows of transducers can be arranged vertically equidistantly spaced apart between two adjacent rows of transducers. This arrangement enables one to direct the reception beams in any desired tilt direction by controlling the phase of the reception signals caught by transducers disposed on an imaginary vertical line with respect to one another It should be noted that although the number of the preamplifiers is reduced by one-half in the foregoing embodiment according to the invention, the number of the preamplifiers can be reduced by two thirds by dividing the ultrasonic transducers into three groups.

While, the invention has been described in detail and with reference to specific embodiments thereto, it will be apparent to one skilled in the art that various changes and modifications can be made therein without departing from the spirit and scope of invention.

What is claimed is:

1. A detection system for receiving incoming signals from a plurality of directions in a manner such that a Doppler effect is produced to vary a carrier frequency of the incoming signals and for presenting a display resulting from the received incoming signals on an indicator, comprising:
   a plurality of ultrasonic transducers for receiving incoming signals;
   a plurality of preamplifiers for amplifying reception signals produced by said ultrasonic transducers;
   first coupling means for connecting at least tow ultrasonic transducers to a single preamplifier;
   a filter for pulse-compressing said reception signals produced by said ultrasonic transducers;
   second coupling means for successively coupling output terminals of said preamplifiers to an input terminal of said filter; and
   an indicator for displaying output signals from said filter.

2. The detection system as claimed in claim 1 herein said first coupling means comprises field-effect transistors, with a source terminal of a single field-effect transistor being connected to a single ultrasonic transducer and a drain terminal thereof being connected to an input terminal of a corresponding single preamplifier.

3. The detection system as claimed in claim 2 wherein a gate terminal of said single field-effect transistor is supplied with a pulse signal shaped in rectangular waveform, wherein leading and trailing edges of of said rectangular waveform are rounded off.

4. The detection system as claimed in claim 2 wherein a plurality of field-effect transistors having source terminals respectively connected to said plurality of contiguous ultrasonic transducers are driven at a same time to pass said reception signals produced by said ultrasonic transducers to the corresponding preamplifiers, respectively.

5. A detection system for receiving incoming signals from a plurality of directions in a manner such that a Doppler effect is produced to vary a carrier frequency of the incoming signals and for presetting a display resulting from the received incoming signals on an indicator, comprising:
   a plurality of ultrasonic transducers for receiving incoming signals, said ultrasonic transducers being classified into n groups each comprising m contiguous transducers wherein m is greater than 1;
   n preamplifiers for amplifying reception signals produced by the ultrasonic transducers;
   first coupling means for connecting in turn m contiguous ultrasonic transducers of each o said n groups to a single preamplifier;
   a filter for pulse-compressing said reception signals produced by said ultrasonic transducers;
   second coupling means for successively coupling output terminals of said m preamplifiers to an input terminal of said filter; and
   an indicator for displaying output signals from said filter.

6. A detection system for receiving incoming signals from a plurality of directions in a manner such that a Doppler effect is produced to vary a carrier frequency of the incoming signals and for presenting a display resulting from the receiving incoming signals on an indicator, comprising:
   a plurality of ultrasonic transducers for receiving incoming signals, said ultrasonic transducers being formed into a plurality of groups, each group having at least two ultrasonic transducers;
   a plurality of preamplifiers for amplifying reception signals produced by said ultrasonic transducers;
   first sampling means for sampling said groups of ultrasonic transducers to produce first sample signals and applying said first sample signals to said preamplifiers, said first sampling means connecting a single group of ultrasonic transducers to a single preamplifier;
   a filter for pulse-compressing said reception signals produced by said ultrasonic transducers; and
   second sampling means for sampling output terminals of said preamplifiers to produce second sample signals and applying said second sample signals to an input terminal of said filter;
   said first sampling means sampling a first ultrasonic transducer in a first group of said group of ultrasonic transducers prior to said second sampling means sampling said single preamplifier corresponding to said first group of ultrasonic transducers;
   said first sampling means sampling a second ultrasonic transducer in said first group of ultrasonic transducers after said second sampling means samples said single preamplifier corresponding to said first group of ultrasonic transducers;
   said second sampling means sampling all remaining preamplifiers prior to resampling said single preamplifier corresponding to said first group of ultrasonic transducers.

7. The detection system as claimed in claim 6, further comprising:
   an indicator for displaying output signals from said filter.

8. The detection system as claimed in claim 6 wherein said first sampling means comprises field-effect transistors, with a source terminal of a single field-effect transistor being connected to a single ultrasonic transducer and a drain terminal thereof being connected to an input terminal of a corresponding single preamplifier.

9. The detection system as claimed in claim 8 wherein a gate terminal of said single field-effect transistor is supplied with a pulse signal shaped in rectangular waveform, wherein leading and trailing edges of said rectangular waveform are rounded off.

10. The detection system as claimed in claim 8 wherein a plurality of field-effect transistors having source terminals respectively connected to said plurality of contiguous ultrasonic transducers are driven at a same time to pass said reception signals produced by said ultrasonic transducers to the corresponding preamplifiers, respectively.

11. A method for detecting a plurality of signals from a plurality of directions in a manner such that a Doppler effect is produced to vary a carrier frequency of the incoming signals, comprising:

(a) receiving a plurality of signals from a plurality of ultrasonic transducers;

(b) amplifying signals produced by the ultrasonic transducers by using a plurality of preamplifiers;

(c) coupling at least two ultrasonic transducers to a single preamplifier;

(d) pulse-compressing the amplified signals received from the preamplifiers; and (e) coupling output terminals of the preamplifiers to an input terminal of a filter.

12. The method as claimed in claim 11 further comprising the step of:

(f) displaying output signals from the filter.

* * * * *